(12) United States Patent
Dodeja et al.

(10) Patent No.: US 7,424,396 B2
(45) Date of Patent: Sep. 9, 2008

(54) METHOD AND APPARATUS TO MONITOR STRESS CONDITIONS IN A SYSTEM

(75) Inventors: Rakesh Dodeja, Portland, OR (US); Neelam Chandwani, Portland, OR (US); Chetan Hiremath, Portland, OH (US); Wen Wei, Beaverton, OR (US); Udayan Mukherjee, Portland, OR (US)

(73) Assignee: Intel Corporation, Santa Clara, CA (US)

(*) Notice: Subject to any disclaimer, the term of this patent is extended or adjusted under 35 U.S.C. 154(b) by 314 days.

(21) Appl. No.: 11/235,467

(22) Filed: Sep. 26, 2005

(65) Prior Publication Data
US 2007/0089011 A1   Apr. 19, 2007

(51) Int. Cl.
*G06F 19/00* (2006.01)

(52) U.S. Cl. .......................... 702/185; 714/25

(58) Field of Classification Search ............... 702/188, 702/29, 33, 35, 113, 114, 115, 50, 127, 121–123, 702/130, 138, 145, 176–178, 182–185; 714/25, 714/48; 701/29, 31, 32, 35
See application file for complete search history.

(56) References Cited

U.S. PATENT DOCUMENTS

| | | | |
|---|---|---|---|
| 6,538,888 B1 | 3/2003 | Wei et al. | |
| 2002/0101715 A1 | 8/2002 | Osecky et al. | |
| 2003/0065409 A1* | 4/2003 | Raeth et al. | ............... 700/31 |
| 2004/0024659 A1 | 2/2004 | Tisson | |
| 2004/0128372 A1 | 7/2004 | Mukherjee et al. | |
| 2004/0260841 A1 | 12/2004 | Tisson | |
| 2005/0068722 A1 | 3/2005 | Wei | |
| 2005/0068731 A1 | 3/2005 | Wei | |
| 2005/0096873 A1* | 5/2005 | Klein | ............... 702/184 |
| 2005/0099771 A1 | 5/2005 | Wei | |
| 2005/0099772 A1 | 5/2005 | Wei | |
| 2005/0125575 A1 | 6/2005 | Kuriappan | |
| 2005/0165577 A1 | 7/2005 | Fasullo et al. | |
| 2008/0036613 A1* | 2/2008 | Gaskins et al. | ............... 340/584 |

FOREIGN PATENT DOCUMENTS

EP   0977111 A2   2/2000
WO   PCT/US2006/037035   1/2007

* cited by examiner

*Primary Examiner*—Edward Raymond
(74) *Attorney, Agent, or Firm*—Daly, Crowley, Mofford & Durkee, LLP

(57) ABSTRACT

Faults are monitored with information from agents for a plurality of sensors located on a plurality of circuit boards. A policy containing a error event thresholds against which the stored sensor information can be compared. Actions can be initiated by a fault module when one or more of the error event thresholds is exceeded.

24 Claims, 9 Drawing Sheets

METHOD AND APPARATUS TO MONITOR STRESS CONDITIONS IN A SYSTEM

BACKGROUND

As is known in the art, fans can be used to force air flow over circuit devices to dissipate heat. This forced air cooling is a well known thermal management mechanism used for various types of electronic equipment having circuits and circuit boards. A chassis, for example, can contain slots for an array of circuit boards, e.g., blades. A fan tray having a series of fan modules can force air into the chassis to cool the blades.

Failure of one or more of the fan modules is undesirable since air flow will be reduced. With reduced air flow into the chassis, the temperature of the components and integrated circuits on the blade may rapidly exceed specified acceptable operating temperatures and stress the components. These conditions can decrease reliability of the equipment and increase the Mean Time Between Failures (MTBF).

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
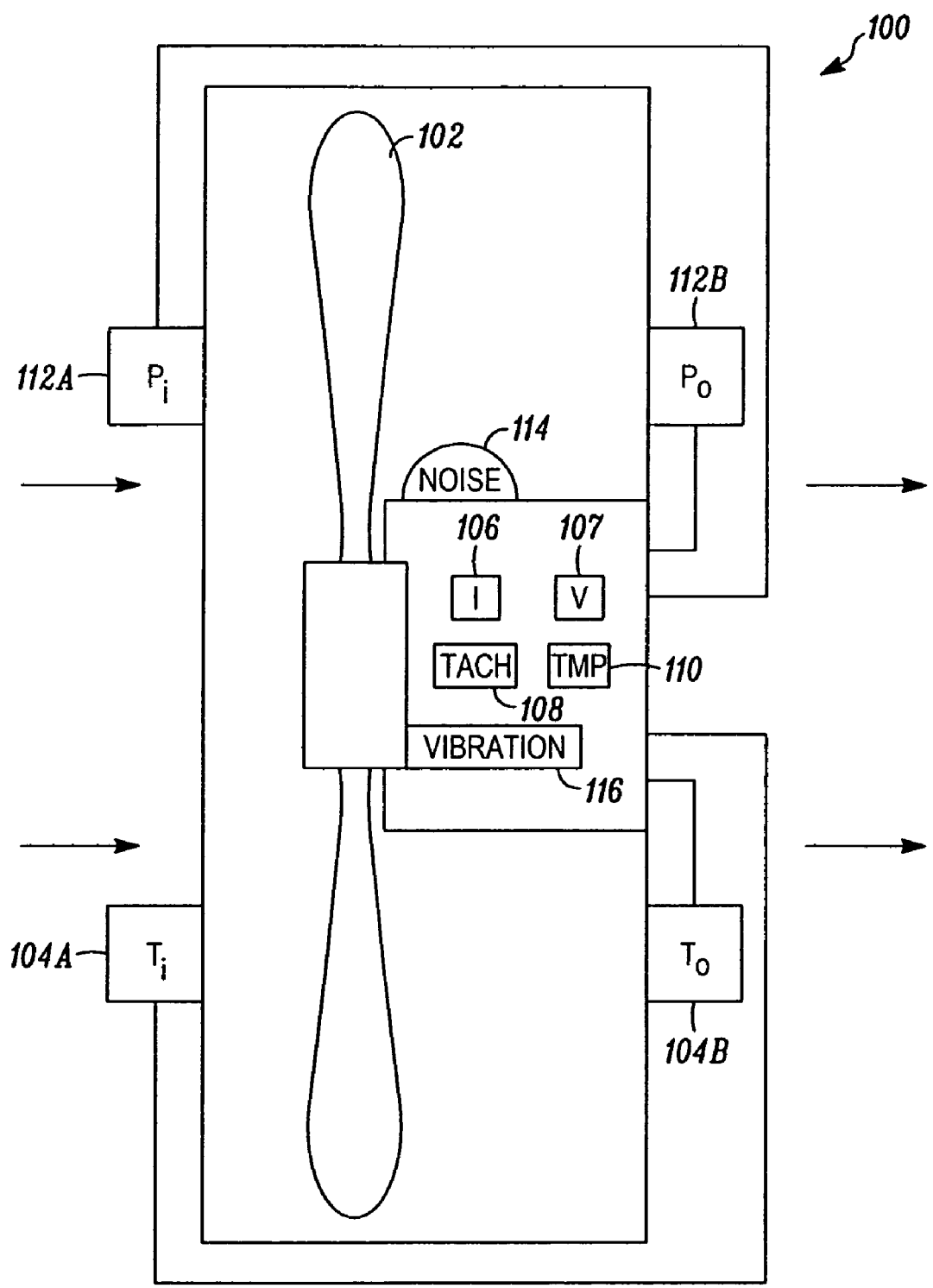
FIG. 1 is a schematic representation of a fan module having sensors to measure operating characteristics.
Figure 1A:
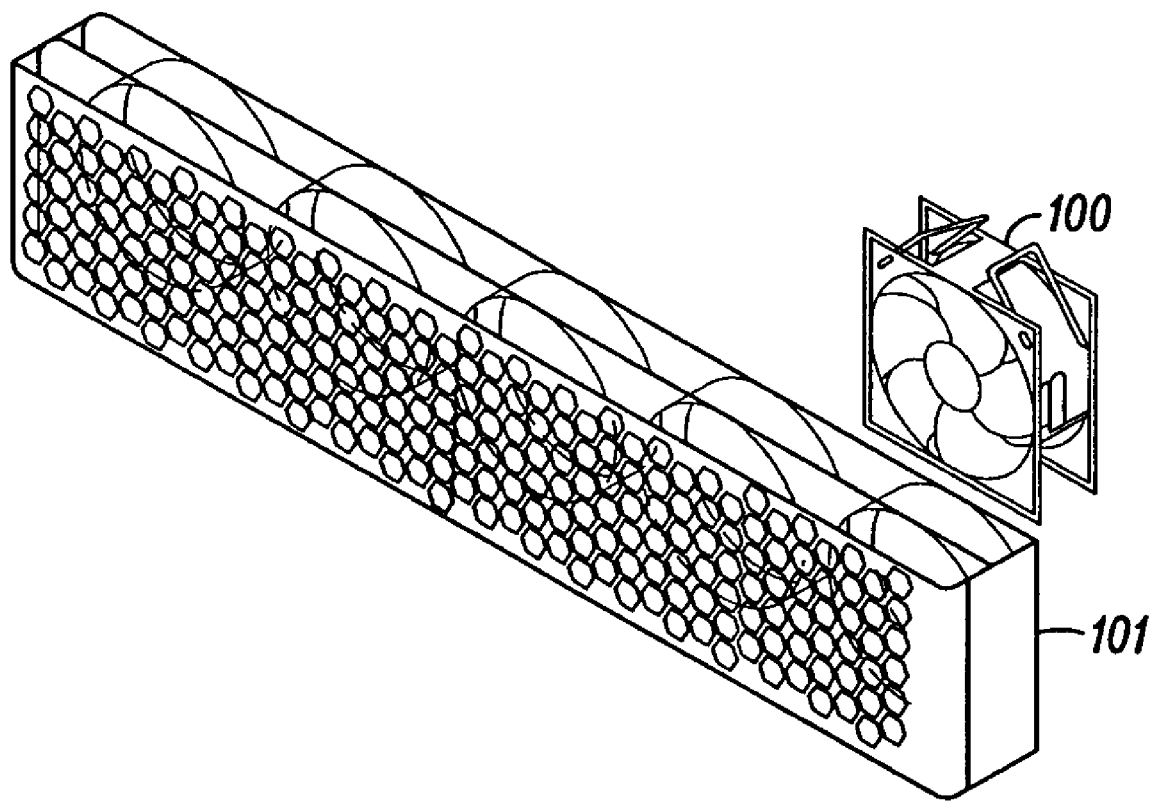
FIG. 1A is a pictorial representation of a fan module that can be placed in a fan tray.

FIG. 1 shows an exemplary fan module 100 having sensors to monitor various operating characteristics of a cooling fan 102 to detect and/or predict fan failures. As shown in FIG. 1A, the fan module 100 can be removably placed in a fan tray 101, which can be coupled to an equipment chassis. The fan sensors can include an input temperature sensor 104a for sensing the temperature of air flowing into the fan and an output temperature sensor 104b for sensing the temperature of air flowing out of the fan. A current sensor 106 can monitor the current used by the fan module 100 and a voltage sensor 107 can measure a voltage supplied to the fan module. A fan blade speed monitor 108, such as a tachometer, can monitor the speed of the fan as it rotates. A fan module temperature sensor 110 can monitor the temperature of circuitry and/or fan motor in the fan module that controls the fan. Input and output pressure sensors 112a,b can provide a pressure differential between an input and output side of the fan. A noise sensor 114, which can be provided as a microphone, measures ambient noise proximate the fan module 100. A vibration sensor 116 monitors vibration levels that may indicate impending mechanical failure or anomaly.

The fan sensors collect various information to monitor the health of the cooling subsystem that may be used to predict failures. For example, fan current level and fan rotation speed baseline information can be obtained after initial operation. If the current and/or fan speed deviate from the baseline levels by greater than a predetermined amount, then an alert can be generated. For example, thresholds that are within 30% deviation can be considered non critical.

The noise sensor 114 can monitor bearing noise from the fan motor. In one embodiment, the noise information can have one or more thresholds. If the noise rises above a first threshold, a first alert for a first level can be generated, which may indicate fan maintenance is suggested. Noise above a second threshold can generate a second alert for a second level indicating that fan failure is imminent. The noise or sound sensor 114 can be placed internal or external to the fan. The signals to be captured represent both sound power or pressure and sound quality in a frequency bandwidth that may be utilized to indicate the fan or system failure modes by comparing the sound signature to existing sound signatures.

The paired pressure sensors 112a,b measure a differential between fan intake and outtake air pressure that can form the basis of alerts when the pressure is above or below one or more threshold settings. In an alternative embodiment, pressure differential information is collected by measuring the torque to the fan blades or hub by torque sensor(s) in the blade or hub. In an exemplary embodiment, in a chassis a normal pressure differential is about 0.15" of $H_2O$. An abnormal condition due to clogged filter will increase pressure differential depending on the condition of the filter.

In one embodiment, a pressure/torque alert correlates to an abnormally reduced Free Area Ratio (FAR) resulting from, a clogged air filter, cabling blockage, insertion of an extraordinarily densely populated blade, and/or some type of obstacle placed at airflow inlet/outlet, etc. The clog or blockage can cause reduced air flow and as a result higher temperatures inside the chassis.

Power can be monitored using information from the current and voltage monitors 106, 107. In one embodiment, a product of electrical current I drawn by the fan and a voltage V supplied to the fan is monitored. The tachometer 108 can also provide rotation speed information.

The work performed by the fan in blowing the air corresponds to power (Watts) consumed per rotation in revolutions per minute (RPM) of the fan blade. Assume the work $W=V*I/RPM$. The computed work over time can be used to evaluate performance of the fan.

A gradual increase of an absolute value of W over a period of time suggests:

1) Possible Filter Clogging—if the work level goes above a predetermined threshold, it is likely that the filter should be replaced.
2) Possible Fan Mechanical failure—a gradual increase in work combined with an increase in fan motor temperature may indicate a possible fan mechanical problem
3) Possible Mechanical Failure—an increase in work in combination with certain noise and/or vibration reading may indicate an impending fan mechanical failure A sudden increase in the amount of work performed by the fan indicates an abrupt change in the airflow condition. Possible causes of the sudden increase include:

1) Sudden obstruction to air flow in the chassis—For Example: This can be caused by installation of non compliant hardware.
2) Impending Fan Bearing Failure—, an increase in work and certain temperature, noise and vibration may point to imminent fan bearing failure.

3) Mechanical obstruction to Fan Blade rotation—This can be caused by a partial lodging of a foreign obstacle obstructing the free rotation of the fan. Noise and vibration sensor information may help identify this type of failure.

Sensor information can be combined to determine the type of failure. For example, if the fan bearing suddenly fails due to high temperature, drying up of lubricants, etc., then there would be a sudden increase in current drawn by the fan motor, a sudden drop in the speed of fan, and possibly, an increase in the noise generated by the fan and also increase in temperature of the fan motor. All these readings can be correlated to predict impending fan failure.

The tachometer 108 can be used to measure the fan spin up time, i.e., the time required for the fan to reach its operating speed. This parameter can be logged over many power-on cycles. The increase in spin up time can be used to detect fan degradation and predict fan failure. Blades in a fan are a moving part where a blade assembly rotates around a central axis of the fan. There is typically a bearing mechanism with appropriate lubricant to allow for free rotation of the blade assembly. This bearing mechanism may degrade over time and the lubricant may loose its viscosity. The fan motor may need more power and time to come up to speed.

Sensor information can be used together with diagnostic control to measure the performance of the cooling subsystem. For example, during maintenance periods and other low load periods, a fan diagnostics module can be activated and perform some online diagnostics on each fan, which can be performed sequentially on each fan. By running fan diagnostics, the over all cooling performance of the chassis is not impacted if the diagnostics take relatively little time, e.g., seconds. The diagnostics can cycle power to the fans and measure speed up time to record any changes. The recorded speedup time provides an indication of the state of lubrication and friction inside the fan mechanical components.

After receiving one or more alerts, a fan controller may increase the fan speed to maintain air flow levels. However, this may reduce the operational life of a fan module or fan tray. While the fan controller increases fan speed to compensate the air cooling loss, the fan controller can also deliver warning message or trigger alarms from its diagnostic system, correlated to the signature of each failure mode, as described below. Such a situation can be recorded as a degraded operating condition. A failure module can monitor the rate and duration of degraded operating conditions and predict failures in cooling subsystem, as described more fully below.

Figure 2A:
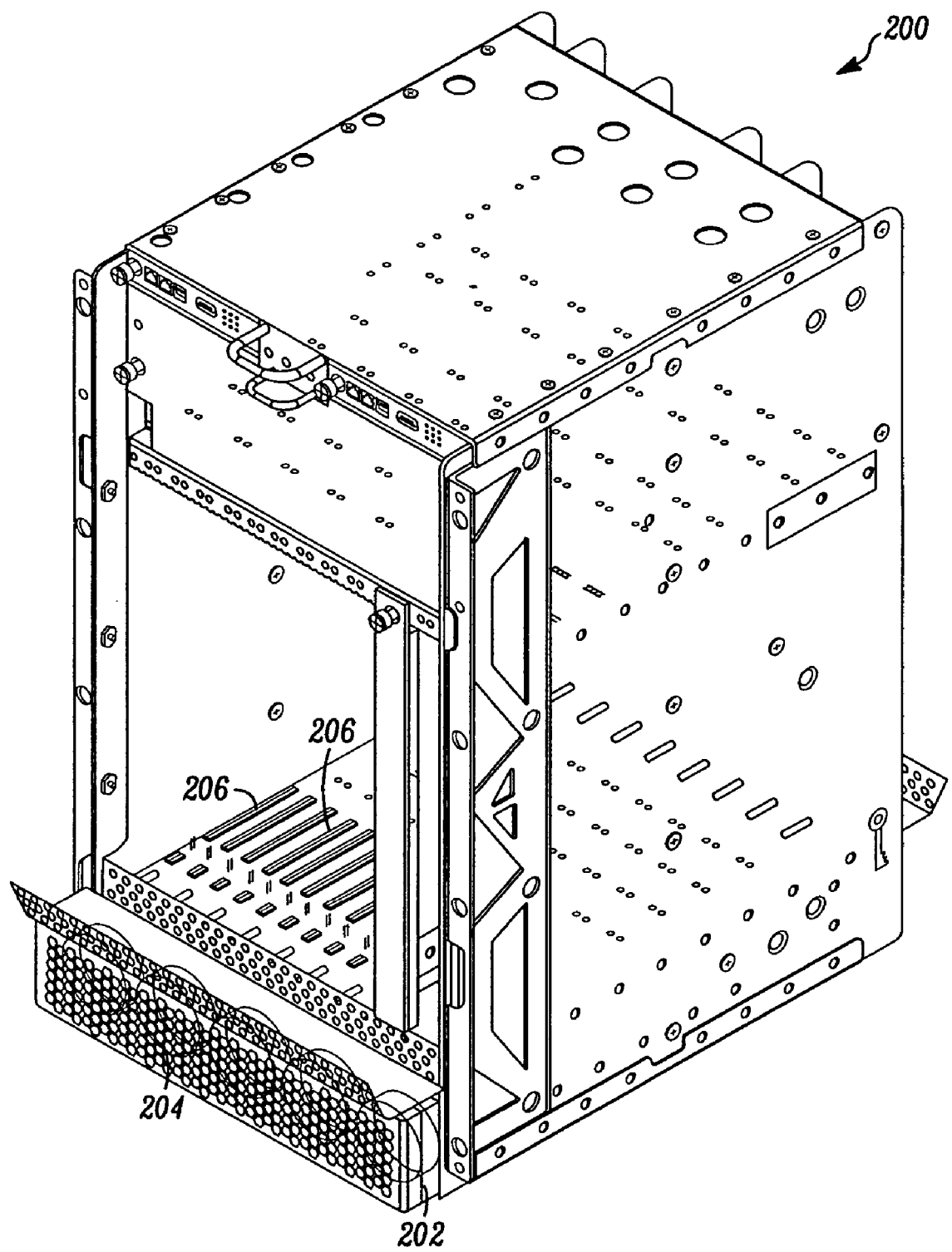
FIG. 2A is a perspective view of a chassis having a fan module with sensors.
Figure 2B:
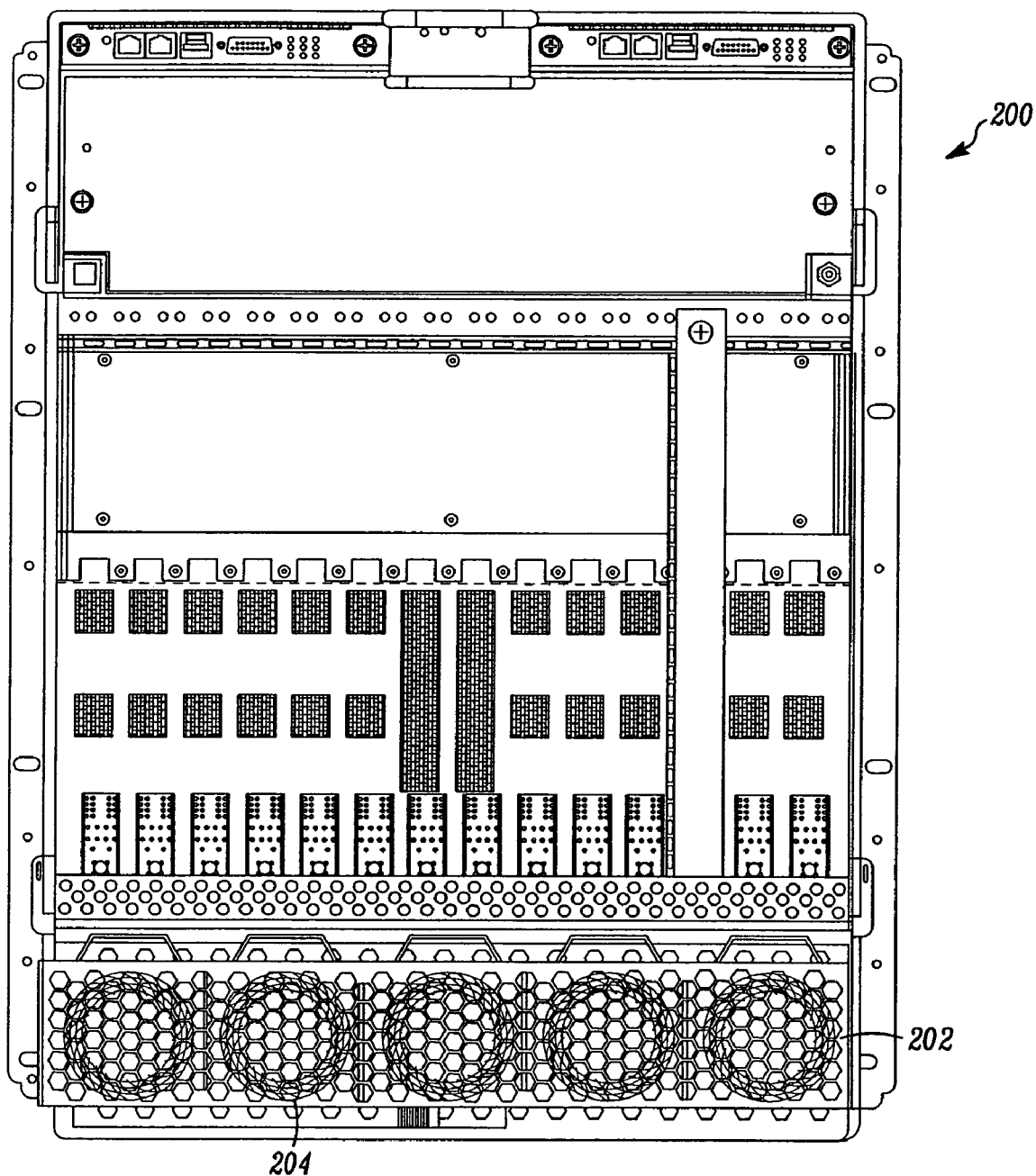
FIG. 2B is a front view of a chassis having a fan module with sensors.
Figure 2C:
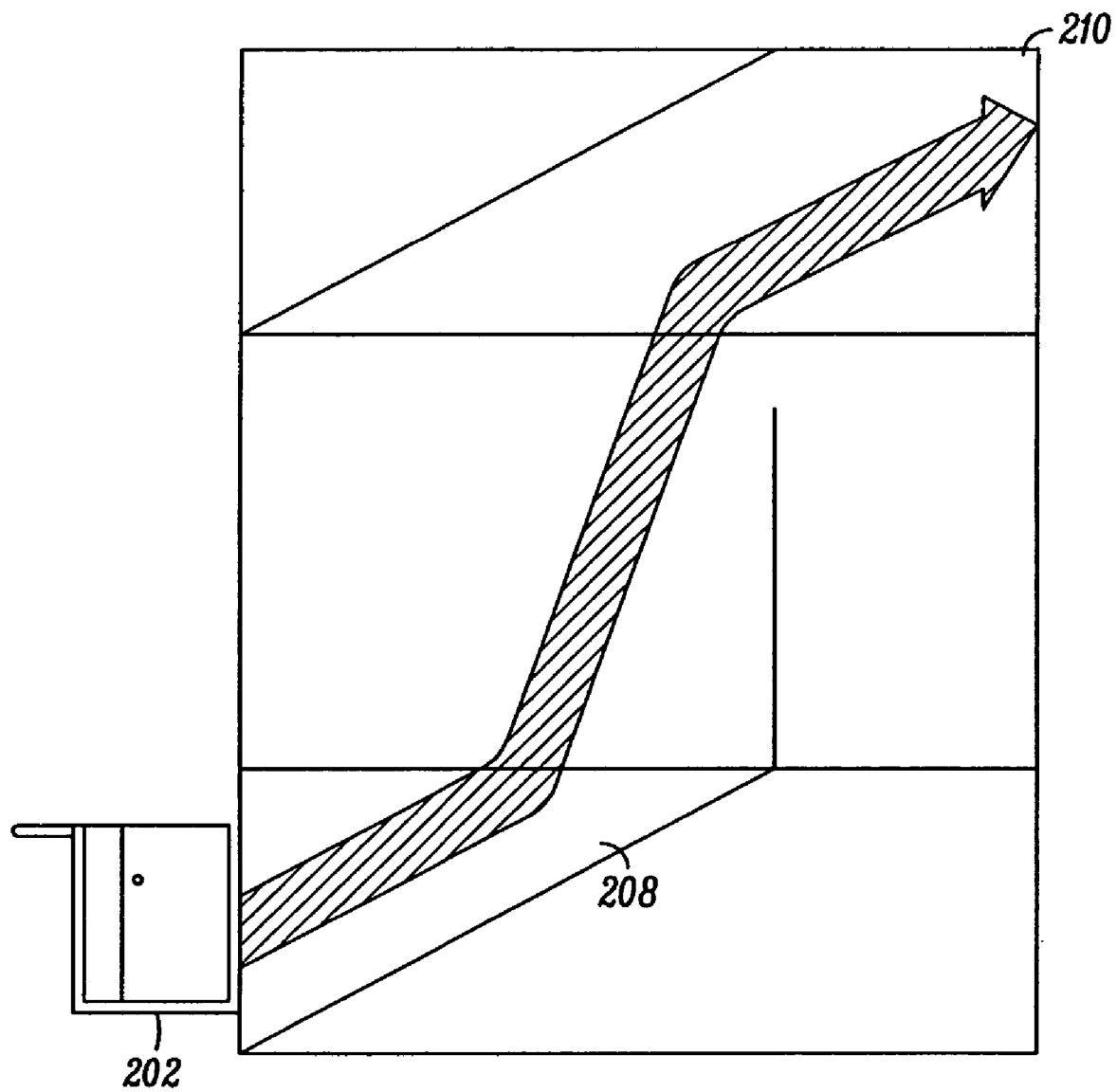
FIG. 2C is a pictorial representation of air flow through a chassis.

An exemplary list of characteristics that can be monitored includes:
Fan Spin UpTime
Start/Stop Count
Power On Hours Count
Power Cycles
Power consumed
Temperature
Spin High Current
Spin Buzz/Noise
Abnormally high Spin Speed
High pressure differential caused by changed Airflow FIGS. 2A and 2B show an exemplary chassis 200 having a fan tray 202 containing a series of fan modules 204 to force air into an interior of the chassis, which has slots 206 into which blades can be inserted. As shown in FIG. 2C the fan modules 204 can draw air into an input air plenum 208 into the chassis interior and out of the chassis via an output air plenum 210.

Figure 3:
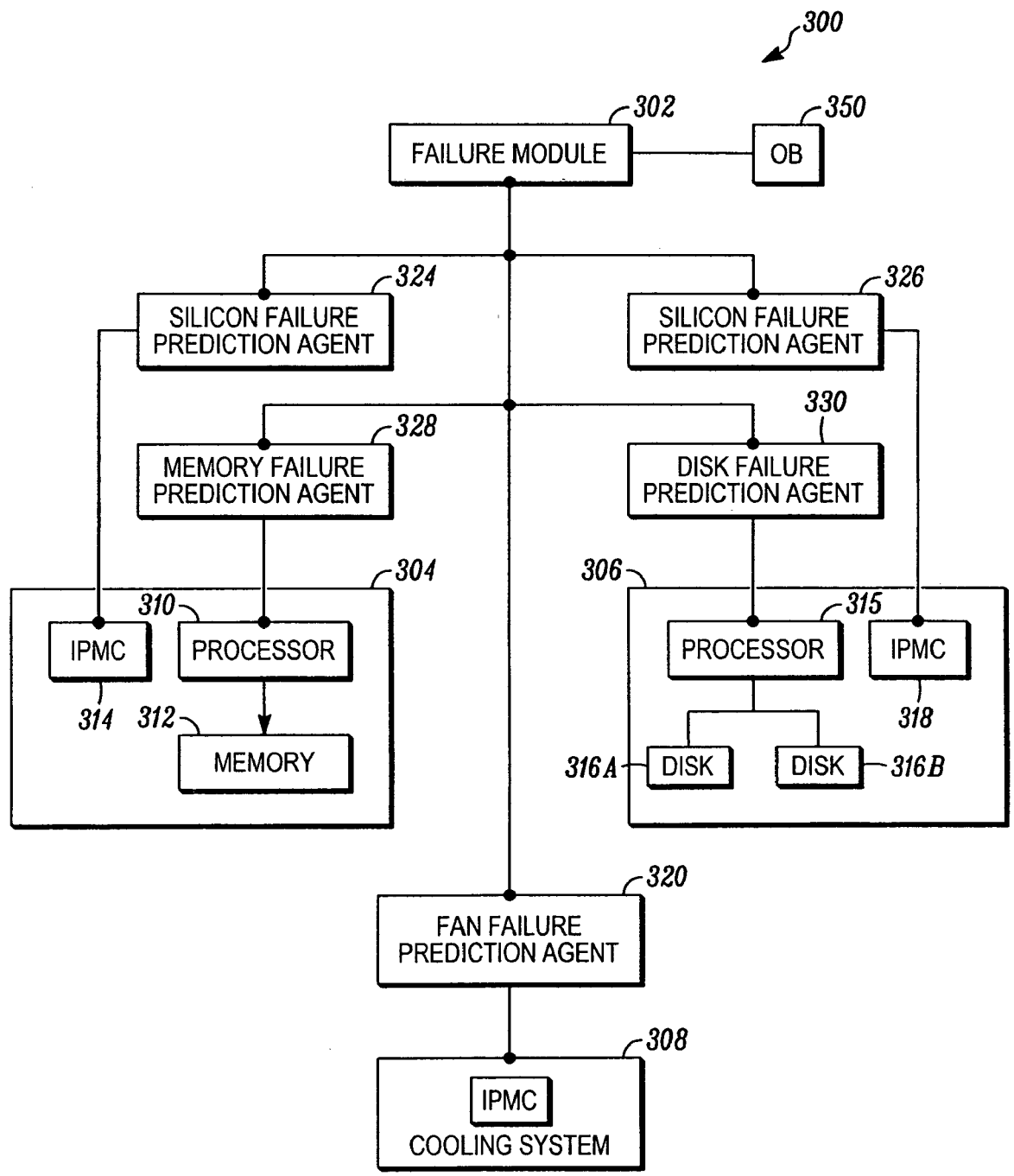
FIG. 3 is a schematic depiction of a system having a failure module.

FIG. 3 shows an exemplary system 300 having a failure module 302 that can monitor and/or predict failures for a processing blade 304 and a storage blade 306, for example, based upon operating characteristics from sensors in blades and/or in a cooling system 308, as described above. The processing blade 304 can include a processor 310, memory 312, and an intelligent platform management controller (IPMC) 314. IPMC is a generic controller that performs various functions including monitoring various operating parameters, such as voltage and temperature on the various components on the platform.

The storage blade 306 can include a processor 315, disks 316a,b and an IPMC 318. The blades can include a variety of integrated circuits, such as processors, programmable logic devices, etc., and discrete components, such as resistors, capacitors, transistors and diodes The failure module 302 can include a series of agents to monitor error information that can be used to predict failures. The agents provide information to the failure module 302 for predicting failures based upon the cooling system 308 and other operating characteristics. In the illustrated embodiment, a fan failure prediction agent 320 is coupled to an IPMC 322 in the cooling system 308. A first silicon failure prediction agent 324 is coupled to the IPMC 314 in the processor blade 304 and a second silicon failure prediction agent 326 is coupled to the IPMC 318 in the storage blade 306. A memory failure prediction agent 328 is coupled to the processor 310/memory 312 and a disk failure prediction agent 330 is coupled to the processor 315 in the storage blade 306.

Integrated circuits on the blades 304, 306 are designed to operate under specified temperature, voltage and frequency conditions. Typically these devices are validated to operate in all corners of the operating range. The operating corners could be, for example, operation at or about the upper limit of the allowed environment temperature or other parameter. Validation plans may include stressing devices beyond the normal operating ranges in various combinations of low, normal and high settings. For example, a device will be tested to operate to its full performance in a low voltage limit, a high temperature limit, and a high frequency limit of the rated specification. Based on the level of integration, function, performance, power dissipation, local heat sinks, and local fan devices of devices on the blades, hotspots on the blade may exist.

On a typical high performance blade, sensors for temperature are built into various components, such as a processor, memory module, and various chipsets. The temperature sensors are typically in the form of temperature sensing diodes connected to analog-to-digital converters providing temperature data for the silicon in these devices. Temperature sensors generally exist inside the disk drives. The IPMC controller on the blade monitors these temperature sensors and reports the data at a predetermined interval to the requesting software. In one embodiment, sensor data records are part of the IPMC internal data structures. Whenever the measured temperature crosses set thresholds, error alerts are generated by the IPMC. Voltage sensors are implemented in a similar fashion and these monitor the voltage levels on the various power supply rails on the platform.

The voltage and temperature probes should be placed as close as possible to the source of power dissipation. It may be noted that the hardware architecture of the blade in the platform can be taken into consideration and the various tolerances that can creep in due to the tolerances of functionality of each individual component. The design may be robust in specifications of performance under various extremes of voltage, frequency and temperature.

Even though a device/component/system operates with full performance, for example 100% CPU (central processing unit) load, there may be an increased likelihood that if the device/component/system continues to operate under full performance during corner conditions due to presence of other devices in the system there will be additional dynamic swings of these parameters of voltage, temperature and even frequency. These dynamic swings are likely to cause the device to operate beyond the ratings and can eventually lead to failures.

Consider a CPU rated to operate at 2 GHz with a maximum die temperature of 100 Deg C and core operating voltage of 1.9V. Due to a sudden increase in the load on the CPU, the temperature goes beyond 100 deg C, say 105 deg C, for about 30 seconds. This operation for 30 seconds at 105 deg C. is operation beyond the rated operating range. These events of dynamic swings beyond the operating range in one or more parameters at the same time will be captured as critical events of operation. The rate at which these events happen will be an indicator how over stressed the devices are, and will be used to predict the degradation of the system and can lead to eventual failures. As used herein, the term "event" refers to an operating condition when one or more of the operating parameters is beyond the rated setting.

The prediction agents 320, 324, 328, 326, 330 extract information from the sensors and based on a policy, which specifies the thresholds of lower and upper margins. The fault module 302 can monitor the sensor information to predict the likelihood of failures.

Figure 4:
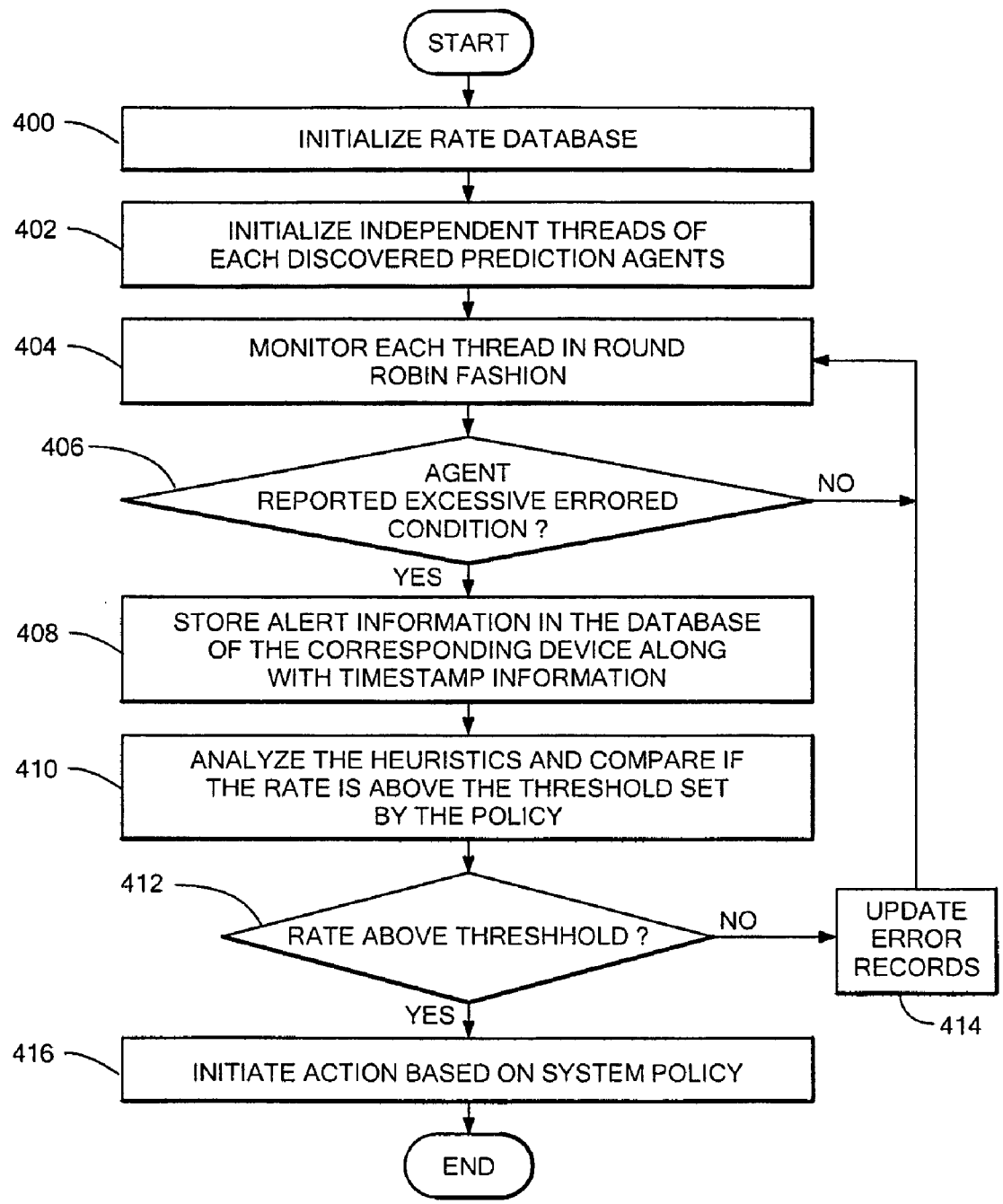
FIG. 4 is a flow diagram showing collection of sensor data.

In one embodiment, the fault module 302 captures event information and builds a database 350 on each event for each event type and its occurrence frequency. The database is compact and built to contain the following information:
Sensor ID
Sensor Type
Sensor Policy
Time Stamp
Time Counter FIG. 4 shows an exemplary process to collect sensor data. In processing block 400, the database to store sensor information is initialized. In block 402, threads in the prediction agents are initialized. As is well known in the art, a thread is a process that is part of a larger process or program. The prediction agent threads are then monitored, such as in round robin fashion, to collected sensor data in block 404. In an exemplary embodiment, at a regular frequency the fault module monitors the database for new events and computes a rate of the events to determine if a stress condition has been caused due to the extreme limits of temperature, voltage and frequency and combinations thereof. Stress conditions are recorded the same or different database, which can store policy stress threshold, actual stress count/rate, timestamp, etc.

In processing decision block 406, it is determined whether an agent reported an error condition, such as exceeding a threshold for a given parameter. If not, the prediction agent threads are monitored in block 404. If so, in processing block 408 alert information is stored in the database for the corresponding device/platform/system, along with other information, such as timestamp.

In processing block 410, the heuristics are compared against predetermined values to determine if the alert rate for the given parameter is greater than a predetermined value in accordance with the alert policy. The term "heuristics" as used herein refers to an application of a predetermined mechanism to determine if the rate of change is above or below the set threshold. In an exemplary embodiment, there is a policy setting for each sensor type. This could be default hard coded for certain sensor types and programmable for other.

In processing decision block 412, it is determined whether the alert rate is above the threshold. If not, in processing block 414 the database is updated with sensor error information and threads are again monitored in block 404. If the rate was above the threshold, in processing block 416, an action is initiated based upon the policy set by a user. An action can include, for example, an operator alarm is triggered to notify that the system is overstressed and needs replacement.

Figure 5:
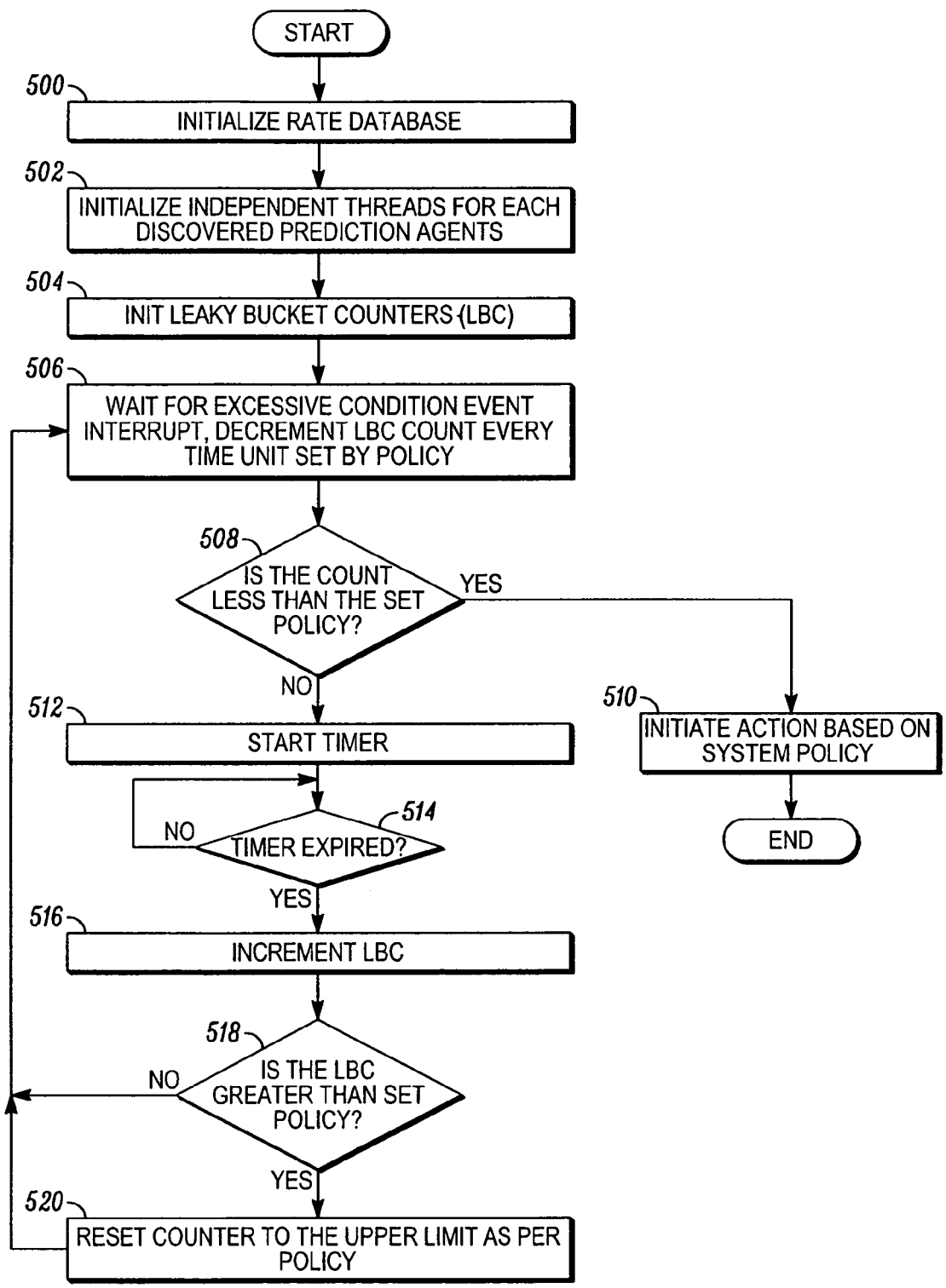
FIG. 5 is a flow diagram showing a leaky bucket fault prediction implementation.

In one embodiment, the fault module 302 utilizes a so-called leaky bucket counter for each of the above sensors, as shown in FIG. 5. In processing block 500, the database is initialized and in block 502 the agent threads are initialized. In processing block 504, the leaky bucket counters are initialized for the events for which a count is maintained and monitored. In block 506, the system waits for a stress event interrupt and the counters are decremented at predetermined time intervals. In decision block 508, it is determined whether the event count is less than the threshold set in the policy. If so, in block 510, an action is initiated based on the policy. If not, then in block 512 a timer is. started to count down a predetermined time interval. In decision block 514 it is determined whether the time is expired by examining the value in the timer. If the timer has not expired the timer value is re-examined in block 514. When the timer has expired, in processing block 516 the leaky bucket counter (LBC) for a given event is incremented. In decision block 518, it is determined whether the LBC value is greater than a predetermined value set in the policy. If so, the LBC is set to its initial value set by the policy in block 520. If not, processing continues in block 506. In summary, a LBC for an event decrements each time a stress event is set and at a periodic rate it is incremented. When the LBC underflows a prediction failure alarm is set. The LBC is reset to its upper limit if no stress events occur.

Figure 6:
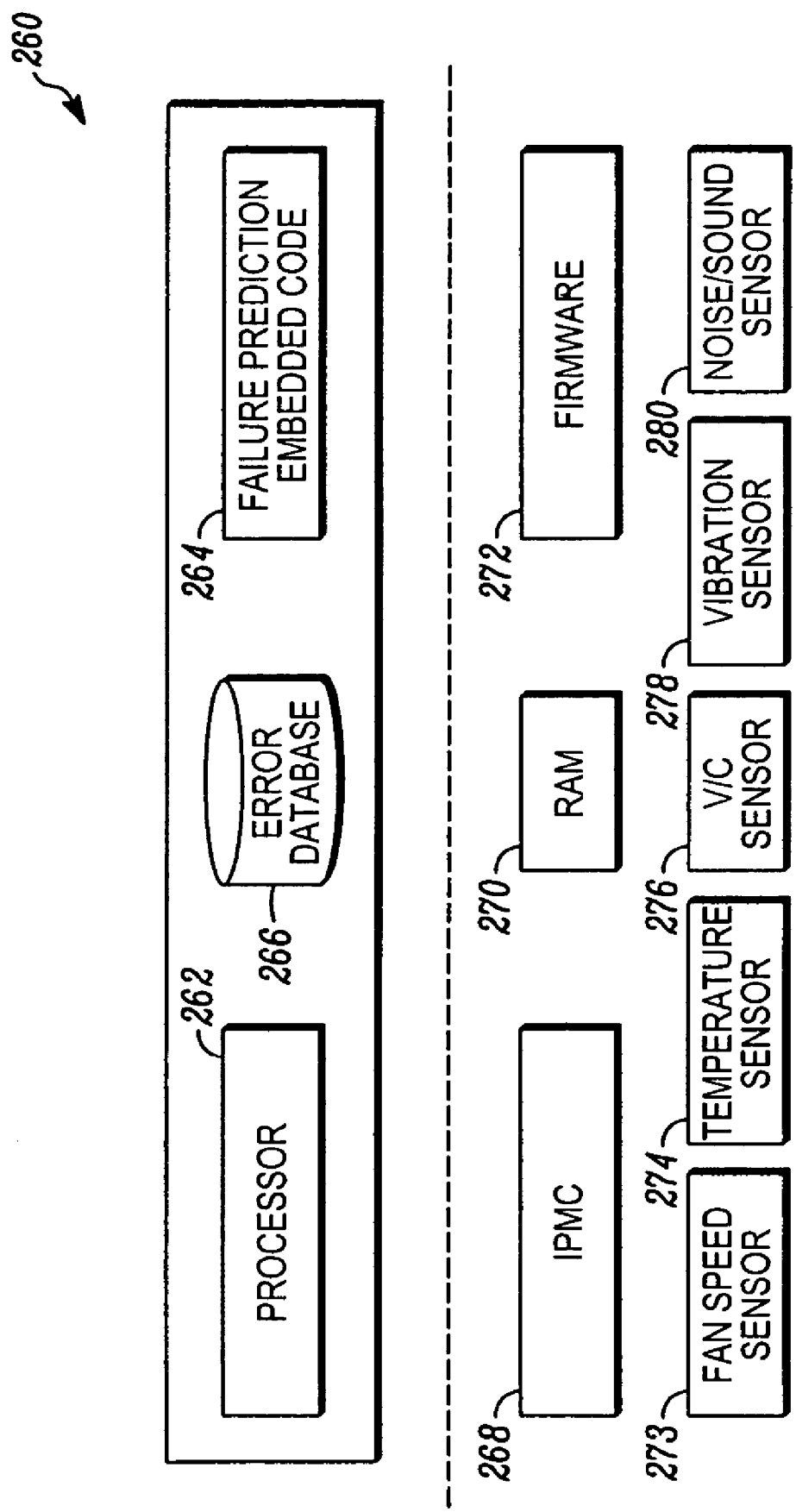
FIG. 6 is a block diagram of a system having a fault module.

FIG. 6 shows an exemplary fan controller embedded system 260 having a processor 262 running instruction from a failure prediction embedded code module 264, both of which exchange data with an error database 266 containing error and/or collected sensor information. An intelligent platform management controller (IPMC) communicates with random access memory (RAM) 270 and firmware 272 to exemplary sensors include a fan speed sensor 273, fan motor temperature sensor 274, fan voltage sensor 276, fan vibration sensor 278, and noise/sound sensor 280. It is understood that a wide range of further sensor and sensor-types, such as temperature and voltage sensors described above, can be included.

Other embodiments are within the scope of the following claims.

What is claimed is:
1. A method of monitoring faults, comprising:
storing information from a plurality of agents for a plurality of sensors located on a plurality of circuit boards;
storing a policy containing a plurality of error event thresholds against which the stored sensor information can be compared;
counting events corresponding to instances of the error event thresholds being exceeded;
initiating an action, by a fault module, based on the counted events, and
monitoring sensors for a chassis cooling fan.
2. The method according to claim 1, further comprising predicting a device failure based upon the counted events, wherein initiating an action comprises initiating an action in response to the predicted device failure.

3. The method according to claim 1 wherein storing information comprises storing temperature and voltage information for a plurality of integrated circuits, and
wherein counting events comprises counting events in which specified temperature and/or voltage parameters exceed corresponding error event thresholds.

4. The method according to claim 3 wherein storing information comprises storing frequency information, and
wherein counting events comprises counting events in which specified temperature, voltage and/or frequency parameters exceed corresponding error event thresholds.

5. The method according to claim 1, further comprising predicting failures based upon the counted events.

6. The method according to claim 5 predicting failures using a leaky bucket counter a leaky bucket counter.

7. The method according to claim 1, further comprising predicting failures based upon a rate that the counted events accumulate.

8. The method according to claim 1 wherein initiating the action comprises generating an operator alarm.

9. The method according to claim 1, wherein the fan sensors include at least three of fan current, fan speed monitor, intake and outtake air temperature, fan motor temperature, intake and outtake differential, noise level, vibration.

10. The method according to claim 9, further including measure fan power over time.

11. The method according to claim 9, further including monitoring three or more of fan spin up time, start/stop count, power on hour count, power cycles, power consumed, temperature, spin high current, spin noise, spin speed, pressure differential.

12. A system, comprising:
a plurality of sensors for collecting information for a plurality of operating parameters;
a database to store the sensor information; and
a fault module to examine the sensor information and count events in which specified operating parameters are exceeded to predict device failures; and
a chassis to contain a plurality of blades.

13. The system according to claim 12, wherein the specified operating parameters include temperature and voltage.

14. The system according to claim 13, wherein certain ones of the temperature and voltage sensors are located proximate integrated circuits.

15. The system according to claim 12, wherein the fault module includes a leaky bucket counter to predict failures.

16. The system according to claim 12, wherein the fault module is implemented as a set of native instruction set on the processor optimized for implementing failure prediction mechanisms.

17. The system according to claim 12, wherein the fault module is implemented as a hardware functional block in an application specific integrated circuit.

18. The system according to claim 12, wherein the fault module is implemented as a hardware functional block instantiated in a processor core.

19. The system according to claim 12, wherein the fault module is implemented as a hardware functional block instantiated in a memory controller chipset.

20. The system according to claim 12, wherein the fault module is implemented as combination of hardware functional blocks instantiated in a processor core and chipset.

21. The system according to claim 12, wherein the fault module is implemented as a hardware functional block in a field programmable gate array.

22. The system according to claim 12, wherein the fault module is implemented on a dedicated core in a many-core or a multi-core processor architecture.

23. A system, comprising:
a plurality of sensors for collecting information for a plurality of operating parameters;
a database to store the sensor information; and
a fault module to examine the sensor information and count events in which specified operating parameters are exceeded to predict device failures,
wherein the plurality of sensors includes fan sensors to predict failure of a cooling fan.

24. The system according to claim 23, wherein the fan sensors include at least three of fan current, fan speed monitor, intake and outtake air temperature, fan motor temperature, intake and outtake differential, noise level, and vibration.

* * * * *